United States Patent Office

2,883,277
Patented Apr. 21, 1959

2,883,277

SYNERGISTIC CORROSION INHIBITING COMPOSITION FOR GASOLINE (DIMER ACID-AGENT 3577 H)

John P. G. Beiswanger, Easton, and John W. Burnard, East Bangor, Pa., assignors to General Aniline & Film Corporation, New York, N.Y., a corporation of Delaware No Drawing. Application October 12, 1956
Serial No. 615,505

10 Claims. (Cl. 44—66)

This invention relates to a novel composition of matter which has been found to be effective for inhibiting corrosion of iron and steel, by low boiling petroleum fractions; particularly, gasoline, to which a small amount of the novel composition of the present invention has been added.

This novel composition, which we found to be effective as a corrosion inhibitor, consists, essentially, of a mixture of about 1 part by weight of a higher fatty acid dimer or trimer (especially, the dibasic acid produced by dimerization and polymerization of linoleic acid) with about 4 parts by weight of a compound obtained by reacting an alkylene polyamine with an unsaturated fatty acid in the molecular proportion of about 1:2, followed by condensation of the thus-produced amide product, whereby all the remaining N-hydrogen atoms are replaced by hydroxyalkoxy groups. For simplicity, this component of our composition is hereinafter referred to as an hydroxyalkoxylated fatty acid amide of a polyalkylene polyamine.

*Alkoxylated fatty acid amide of polyalkylene polyamide component.*—The alkoxylated fatty acid amide of polyalkylene polyamines, which form the major component of our composition may be prepared by (a) reaction of one mole of a polyalkylene polyamine with two molecular equivalents of an unsaturated higher fatty acid compound, followed by (b) reaction of the product of step (a) with more than sufficient alkylene oxide to condense with all the remaining replaceable N-hydrogen atoms therein. It will be understood that the term "N-hydrogen atoms" denotes hydrogen atoms attached to nitrogen.

The preferred polyalkylene polyamine to be employed in step (a) is diethylene triamine. However, other polyalkylene polyamines may be employed, as for example, triethylene tetramine, tetraethylene pentamine, pentaethylene hexamine, and mixtures thereof; and the crude amine mixture resulting from the reaction of ammonia with ethylene dichloride, and the like.

Examples of unsaturated higher fatty acids which may be reacted with the polyalkylene polyamine are oleic, ricinoleic, irucic, linolenic, elaeoastearic, licanic, arachidonic, clupanodonic, lauroleic, myriatoleic, palmitoleic, gadoleic and the like. The esters of the aforementioned acids with ethanol, methanol, isopropanol, and the like, may also be employed. Fats and oils are also operative, and are desirable in view of their low cost. Examples of fats and oils which may be used are soybean oil, sperm oil, safflower, salmon, sardine, sesame, sunflower, teaseed, tung, ucuhuba, walnut, whale, babassu, castor, coconut, cod, corn, cottonseed, dogfish, hempseed, herring, kapok, linseed, menhaden, mustard, neat's-foot, oiticica, olive, ouricury, palm, peanut, palm-kernel, perilla, pilchard, poppyseed, rape, rubberseed oil, and mutton or beef tallow, house grease and other naturally occurring glycerides containing unsaturated acids. It is not necessary to remove the glycerol by-product formed when using fats and oils from the intermediate diamide or from the final quaternary product. In general, all of these operative unsaturated higher fatty acids and esters thereof contain an unsaturated aliphatic radical of from about 8 to 22 carbon atoms.

The amidation reaction of step (a) is, in general, carried out at temperatures ranging from about 130 to 200° C. for a sufficient time to complete the reaction. The reaction is preferably carried out at temperatures of about 130 to 140° C., with an optional subsequent heating step at about 190 to 200° C. No catalyst or solvent is necessary in carrying out this amidation reaction. The product of this step is for the most part an aminodiamide compound, combined with small amounts of triamides, and the like. As stated above, at least two molecular equivalents of the unsaturated higher fatty acid compound should be employed for each mole of polyalkylene polyamine. It will be understood that this requires the use of at least two moles of the free unsaturated fatty acid or at least ⅔ mole of the corresponding glyceride. Experiments have shown that amidation occurs preferentially at a secondary amino group in the polyalkylene polyamine and that even when an excess of the fatty acid compound is employed, the product is mainly composed of the diamide. For purposes of simplicity and clarity, replacement of an N-hydrogen atom by an acyl radical is referred to herein and, in the appended claims, as an amide formation, regardless of whether the N-hydrogen atom is in a primary amino group or a secondary amino group.

In carrying out step (b) of the process, the product of step (a) is reacted with an amount of an alkylene oxide in excess of that necessary to condense with all the remaining replaceable N-hydrogen atoms in said product. The excess alkylene oxide will react with the previously formed hydroxyalkyl groups to produce a compound having at least one polyoxyalkyl radical. In order to accomplish this, at least 4 and up to 20 moles of alkylene oxide must be reacted with each mole of the product of step (a). The condensation may be carried out in well known manner in the presence of a catalytic amount of an alkaline condensing agent, such as sodium hydroxide or the like, and, if desired, under pressure. It is preferred, however, to carry out the condensation with the alkylene oxide in the absence of an alkaline catalyst, since, under these conditions, the amino groups in the amidation polyalkylene polyamine product of step (a) are more reactive than hydroxy and amide groups, whereby condensation with all remaining replaceable amino-hydrogens is insured. If desired, the initial stage of the alkoxylation may be carried out in the absence of a catalyst to promote replacement of all remaining replaceable N-hydrogen atoms with hydroxyalkyl groups, after which an alkaline catalyst such as KOH, NaOH, tertiary amine or quaternary hydroxide may be added to promote further reaction of the alkylene oxide with the hydroxyalkyl groups to produce any desired number of polyalkoxy chains of the desired length. The alkoxylation reaction of step (b) may be carried out at temperatures of from 80° to 180° C., preferably about 110 to 140° C. in a closed vessel. These products are preferred which contain about 5 alkoxy groups per mole. The preferred alkylene oxide is ethylene oxide, although propylene oxide or butylene oxide may also be employed.

The resulting composition is a mixture in which the alkoxylated amino diamide is present in predominant amounts. However, small amounts of alkoxylated( tertiary amino) triamides are also present. When a fat or oil is employed, as the acylating agent, glycerol, glycerides or oil is employed, as the acylating agent, glycerol, glycerides etc. are also present. Thus, when diethylene triamine is employed as the starting polyalkylene polyamine, the composition will contain, in predominant amounts of at least 50 percent by weight, the quaternary ammonium derivative of the alkoxylated amino-diamide of the following formula:

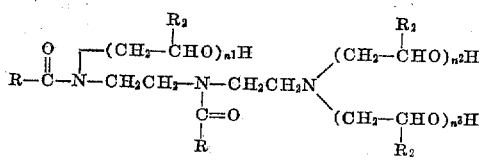

in which R is an unsaturated aliphatic radical of from about 7 to 21 carbon atoms; $R_2$ is selected from the group consisting of H and lower alkyl; $n^1$, $n^2$ and $n^3$ each have a value of at least 1 and a total of from about 4 to 20. In the above formula, the sum of $n^1$, $n^2$ and $n^3$ is preferably about 5, R is derived from soybean fatty acids, and $R_2$ is H.

The other component of our composition is, as stated, a higher fatty acid of 15 to 30 carbon atoms; and, preferably, a dimer or trimer of an unsaturated higher fatty acid, such dimer or trimer having from 30 to 60 carbon atoms.

As examples of such fatty acids and their dimers and trimers may be mentioned linoleic acid, linolenic acid, ricinoleic acid, or their dimers and trimers, palmitic acid, stearic acid, or mixtures of the same. A preferred fatty acid component of our composition is a commercially available polymerized linoleic acid, which is essentially a dibasic acid produced by the dimerization and polymerization of linoleic acid, and which has the following typical specifications and characteristics:

| | |
|---|---|
| Iodine value | 80–95. |
| Average molecular weight | 560. |
| Dimer content | Approx. 85%. |
| Trimer content | Approx. 12%. |
| Monomer content | Approx. 3%. |

This specific polymerized linoleic acid was used as the fatty acid component of the compositions, described in the specific examples below. In order to fully illustrate the present invention, the following specific examples thereof are given:

EXAMPLE I

*Preparation of alkoxylated fatty acid amide of polyalkylene polyamine*

In a 2-liter, 3-necked flask, equipped with thermometer, stirrer and downward condenser, there was charged 900 grams (ca. 1.0 mole) crude, degummed soybean oil, and 134.2 grams (1.3 mole) diethylenediamine. The mixture was heated at 137 to 140° C. for 6½ hours. That temperature was then raised to 200° C. and this temperature maintained for 2 hours. The resulting product was a tan paste, and consisted predominantly of the soybean fatty acid diamide of triethylene-diamine, although a small amount of the triamide was also, probably, present.

900 grams of this amide product were then charged into a 2-liter, stainless steel autoclave, having an anchor-type stirrer (250 r.p.m.). The autoclave was equipped with a special ethyleneoxide reservoir to deliver weighed quantities of ethylene oxide into the autoclave above the surface of the reaction mixture. This reservoir was charged with 212 grams (4.8 moles) of ethylene oxide. After the amide product had been charged into the autoclave, the autoclave was purged with nitrogen three times, at 50 p.s.i. The pressure was then raised to 100 p.s.i., with nitrogen, and allowed to stand for twenty minutes as a test for leaks. The nitrogen was vented and the charge in the reaction clave heated to reaction temperature of 130° C. The autoclave was then evacuated to −5 to −10 inches of water, and ethylene oxide was then immediately admitted from the heated reservoir. The pressure in the autoclave was regulated at 25 to 30 p.s.i., by the temperature of the ethylene oxide reservoir. After 15 to 20 minutes, there was noticeable heat reaction, which, although not severe, necessitated the use of the cooling finger in the autoclave. The end of the reaction was indicated by a pressure drop, after two hours; and the product was then discharged at 90° C. The total yield of product was 1109 grams, indicating that 209 grams of ethylene oxide had reacted. This product was an amber colored liquid, and will be referred to, hereinafter, as an ethoxylated soybean fatty acid of diethylenetriamine.

This ethoxylated soybean fatty acid of diethylenetriamine was mixed with varying proportions of the above-described dimer of linoleic acid, and it was found that when approximately 4 parts by weight of this ethoxylated soybean fatty acid amide of diethylenetriamine were mixed with 1 part by weight of the linoleic acid dimer, the thus-obtained mixture exhibited superior corrosion inhibitive properties when added in small amounts to white gasoline. The amount of ethoxylated soybean fatty acid amide of diethylenetriamine has been found to be in the range of 75 to 85% by weight of the total composition, and the remainder of 25 to 15% of the weight of the composition consisting of linoleic acid dimer. The specific compositions which were found to have these superior corrosion inhibitive properties are described in Table I, below, along with the results obtained in subjecting this composition, and also each of the components of the composition, to the following test, which is a modification of test procedure ASTM D665 52T, found in ASTM 1953 Supplement, page 101. The test procedure was as follows, using a synthetic brine of the following composition:

| Salt: | Grams per liter |
|---|---|
| NaCl | 24.54 |
| $MgCl_2 6H_2O$ | 11.10 |
| $Na_2SO_4$ | 4.09 |
| $CaCl_2$ | 1.16 |
| KCl | 0.69 |
| $NaHCO_3$ | 0.20 |
| KBr | 0.10 |
| $H_3BO_3$ | 0.03 |
| $SnCl_2 6H_2O$ | 0.04 |
| NaF | 0.003 |

To the above was added 0.1 N $Na_2CO_3$ until the pH was between 7.8 and 8.2. One or two milliliters of the carbonate solution were required.

Into 600 ml. dye beakers, there was placed 40 ml. of the above synthetic brine, and 300 ml. of white gasoline, to which an amount of inhibitor composition, under test, as shown in Table I, below, had been added. This resulted in a 2-phase system, with the gasoline floating on the brine. Each beaker was equipped with a plastic cap, having holes for insertion of test panels, and for stirring rod insertion. The solutions were stirred for approximately 15 minutes at 200 r.p.m., and at room temperature, and weighed steel panels (about 28 grams), were inserted into each beaker. The panels were SAE 1006 steel, 1″ x 6″ x .038″, and were held in place by screw clamp, supported on the lid. Each panel was lowered into the gasoline, until the bottom edge was approximately 3⁄16″ above the surface of the brine. In this position, approximately 3″ of the panel were immersed. Stirring was continued for 24 hours, after which the panels were removed, cleaned, dried and weighed. The weight loss was calculated by the following formula:

$$WL = WB - WA$$

where $WL$ = weight loss
$WB$ = weight of panel before test
$WA$ = weight of panel after test The specific mixtures tested, and results of test, described above, are shown in Table I.

TABLE I

| | Mg. Wt. Loss at 25 p.p.m. | Mg. Wt. Loss at 10 p.p.m. | Mg. Wt. Loss at 5 p.p.m. |
|---|---|---|---|
| 100% Ethoxylated soybean fatty acid amide of diethylene triamine | 37.3 | | |
| 100% Polymerized Linoleic Acid | 0.8 | 2.3 | 14.2 |
| Mixture A: 1,181 parts ethoxylated soybean fatty acid amide of diethylene triamine / 302 parts polymerized linoleic acid | | 0.5 | 0.6 |
| Mixture B: 1,181 parts ethoxylated soybean fatty acid amide of diethylene triamine / 332 parts polymerized linoleic acid | | 0.4 | 1.2 |
| Mixture C: 1,181 parts ethoxylated soybean fatty acid amide of diethylenetriamine / 272 parts polymerized linoleic acid | | 0.2 | 0.6 |
| Mixture D: 1,181 parts ethoxylated soybean fatty acid amide of diethylenetriamine / 200 parts polymerized linoleic acid | | 0.3 | |

Control Panels (nothing added to gasoline or brine) 21.6 mg. wt. loss.

It will be apparent from a consideration of the foregoing table that the mixtures of the ethoxylated fatty acid amide of diethylenetriamine, and linoleic acid dimer provide superior corrosion protection, when compared with either the amide product alone, which, in fact, appears to be a corrosion accelerator in this system, or the linoleic acid dimer alone.

While the foregoing describes a preferred composition of the present invention, it will be apparent that, in place of the linoleic acid dimer, used in the products tested, as above-described, other fatty acids, or, particularly, dimers and trimers of unsaturated fatty acids may be employed in its place; such fatty acid component, comprising from 15 to 25% of the total composition. It will also be apparent that, in place of the ethoxylated soybean fatty acid of diethylene triamine, other alkoxylated fatty acid amides of polyalkylene polyamines may be used, such alkoxylated fatty acid amides of polyalkylene polyamines forming from 75 to 85% of the total composition.

It will be apparent that the novel compositions of the present invention are of use as additives to petroleum fractions; particularly, gasoline and kerosene, and, also, fuel oils, to prevent corrosion of pipe line storage tanks, tankers, etc.

We claim:

1. A composition adapted for addition to low-boiling petroleum fractions to inhibit corrosion of iron in contact therewith, which consists, essentially, of 75 to 85% by weight of (I) an alkoxylated fatty acid amide of a polyalkylene polyamine obtained by (a) reacting one mole of diethylene triamine with two molecular equivalents of an unsaturated higher fatty acid compound; (b) reacting the product of step (a) with more than sufficient ethylene oxide to condense with all the remaining replaceable N-hydrogen atoms therein the thus obtained alkoxylated fatty acid amide of diethylene triamine containing a predominant amount of a product of the formula:

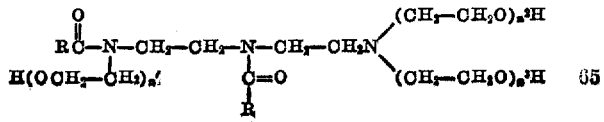

wherein $$R-\overset{O}{\underset{\|}{C}}-$$

represents the acyl radical of an unsaturated aliphatic fatty acid of from 7 to 21 carbon atoms and $n'$, $n^2$ and $n^3$ are each integers of at least 1, the total of $n'$, $n^2$ and $n^3$ being from 4 to 20, and (II) 25 to 15% by weight of a higher fatty acid of 15 to 60 carbon atoms.

2. A composition as defined in claim 1 wherein the unsaturated fatty acid compound specified at (I)(a) is soybean oil employed in a ratio of two-thirds of a mole for each mole of diethylene triamine.

3. A composition as defined in claim 1, wherein the higher fatty acid specified as (II) is polymerized linoleic acid, the major portion of which is linoleic acid dimer.

4. A composition as defined in claim 3 wherein the unsaturated fatty acid compound specified at (I)(a) is soybean oil employed in a ratio of two-thirds of a mole for each mole of diethylene triamine.

5. A composition as defined in claim 4 wherein the low-boiling petroleum fraction specified is gasoline.

6. The method of inhibiting the corrosion of iron surfaces in contact with a low-boiling petroleum hydrocarbon fraction and an aqueous brine, which comprises incorporating in said petroleum hydrocarbon fraction a small amount sufficient to inhibit such corrosion of a composition as defined in claim 1.

7. The method of inhibiting the corrosion of iron surfaces in contact with a low-boiling petroleum hydrocarbon fraction and an aqueous brine which comprises incorporating in said petroleum hydrocarbon fraction a small amount sufficient to inhibit such corrosion of a composition as defined in claim 2.

8. The method of inhibiting the corrosion of iron surfaces in contact with a low-boiling petroleum hydrocarbon fraction and an aqueous brine which comprises incorporating in said petroleum hydrocarbon fraction a small amount sufficient to inhibit such corrosion of a composition as defined in claim 3.

9. The method of inhibiting the corrosion of metal surfaces in contact with a low-boiling petroleum hydrocarbon fraction and an aqueous brine which comprises incorporating in said petroleum hydrocarbon fraction a small amount sufficient to inhibit such corrosion of a composition, as defined in claim 4.

10. The method of inhibiting the corrosion of iron surfaces in contact with gasoline and an aqueous brine which comprises incorporating in said gasoline a small amount, sufficient to inhibit such corrosion, of a composition as defined in claim 4.

References Cited in the file of this patent

UNITED STATES PATENTS

| 2,632,695 | Landis et al. | Mar. 24, 1953 |
| 2,736,641 | Mattson et al. | Feb. 28, 1956 |
| 2,745,809 | Cardwell et al. | May 15, 1956 |

FOREIGN PATENTS

| 415,718 | Great Britain | Aug. 28, 1934 |